(12) United States Patent
Akyildiz et al.

(10) Patent No.: US 11,705,964 B2
(45) Date of Patent: Jul. 18, 2023

(54) LARGE-SCALE CONSTELLATION DESIGN FRAMEWORK FOR CUBESATS

(71) Applicant: Georgia Tech Research Corporation, Atlanta, GA (US)

(72) Inventors: Ian F. Akyildiz, Atlanta, GA (US); Ahan Kak, Murray Hill, NJ (US)

(73) Assignee: Georgia Tech Research Corporation, Atlanta, GA (US)

( * ) Notice: Subject to any disclaimer, the term of this patent is extended or adjusted under 35 U.S.C. 154(b) by 120 days.

(21) Appl. No.: 17/501,125

(22) Filed: Oct. 14, 2021

(65) Prior Publication Data

US 2022/0116107 A1 Apr. 14, 2022

Related U.S. Application Data

(60) Provisional application No. 63/091,666, filed on Oct. 14, 2020.

(51) Int. Cl.
*H04W 36/00* (2009.01)
*H04B 7/185* (2006.01)
*H04W 16/26* (2009.01)
*H04B 7/195* (2006.01)

(52) U.S. Cl.
CPC ........ *H04B 7/18521* (2013.01); *H04B 7/195* (2013.01); *H04W 16/26* (2013.01)

(58) Field of Classification Search
CPC ... H04B 7/18521; H04B 7/195; H04W 16/26; H04W 16/18

USPC ........................................................ 455/427
See application file for complete search history.

(56) References Cited

U.S. PATENT DOCUMENTS

| | | | |
|---|---|---|---|
| 9,906,291 B1* | 2/2018 | Nakamura | H04B 7/18521 |
| 2017/0070939 A1* | 3/2017 | Chong | H04B 7/18513 |
| 2019/0300208 A1* | 10/2019 | Fitzgerald | B64G 1/10 |

* cited by examiner

Primary Examiner — Tanmay K Shah
(74) Attorney, Agent, or Firm — Bryan W. Bockhop; Bockhop Intellectrual Property Law, LLC

(57) ABSTRACT

A computational framework for designing a constellation that includes a plurality of cube satellites (CubeSats) includes an orbit propagation module, a coverage estimation module, a connectivity estimation module and an annealing module. The orbit propagation module receives a plurality of static parameters for the constellation and determines a position vector, a ground track and sub-satellite points for each of the plurality of CubeSats. The coverage estimation module receives the plurality of static parameters for the constellation and estimates Earth coverage for the constellation. The connectivity estimation module receives the plurality of static parameters for the constellation and determines active inter-satellite links (ISL) in the constellation. The annealing module receives input from the orbit propagation module, the coverage estimation module and the connectivity module and employs an annealing algorithm that generates a constellation design.

10 Claims, 3 Drawing Sheets

LARGE-SCALE CONSTELLATION DESIGN FRAMEWORK FOR CUBESATS

CROSS-REFERENCE TO RELATED APPLICATION(S)

This application claims the benefit of U.S. Provisional Patent Application Ser. No. 63/091,666, filed Oct. 14, 2020, the entirety of which is hereby incorporated herein by reference.

BACKGROUND OF THE INVENTION

1. Field of the Invention

The present invention relates to satellites and, more specifically to a framework for generating satellite constellations.

2. Description of the Related Art

Satellite communications have been recognized as a key component of 5G systems for establishing remote connectivity, and are widely expected to play an increasingly ubiquitous role in the next-generation 6G wireless systems. The proliferation of satellite communications solutions has been driven in large part by the availability of low-cost launch opportunities, and advances in satellite hardware design allowing for the use of commercial off-the-shelf (COTS) components. Together, these two factors have led to the democratization of space, with startups, research institutions, universities, and even high schools emerging as important stakeholders. In particular, concerning the latter, a new class of miniaturized satellites known as CubeSats is being seen as a promising solution for realizing robust connectivity at low costs.

CubeSats have uniform cubic sizes denoted as 1U, 2U, and so on, where "1U" refers to a $10\times10\times10$ cm$^3$ cube, and can be used for applications in numerous research fields including biochemistry, astrophysics, and telecommunications. Recently introduced is the concept of the Internet of Space Things (IoST), a cyber-physical system spanning air, ground, and space, IoST is centered around CubeSats operating in the exosphere and is intended to serve a plethora of applications relating to monitoring and reconnaissance, in-space backhauling, and cyber-physical integration. A ubiquitous system of this kind generally requires optimized coverage and consistent connectivity. For example, certain use cases may necessitate global coverage, while others may require targeted region-specific coverage. Thus, optimal constellation design is of great importance to mission planners, the significance of which comes from the fact that it has a direct impact on the system's cost, scalability, and efficacy.

Conventional low Earth orbit (LEO) constellations are typically characterized by the presence of fewer than a hundred satellites, and as such cannot meet the needs of systems such as IoST. Motivated by the need for improved coverage, reliable connectivity, and increased redundancy, mega-constellations of several hundred satellites have gained significant traction over the past two years. In general, constellation design typically involves solving for several inter-related parameters such as: (i) the apogee and perigee radii, (ii) the orbital eccentricity, (iii) the number of CubeSats per orbital plane, (iv) the number of orbital planes, and (v) the initial longitude of the ascending node, argument of perigee, and true anomaly of the constituent CubeSats. While a fairly challenging problem in itself, the presence of an extremely large number of satellites further serves to complicate the problem. The existing state-of-the-art constellation design frameworks are largely geared towards the design of systems with a few dozen satellites at best.

IoST is part of a larger effort to push the boundaries of space systems. In particular, we note the presence of several complementary works in the domain of satellite-focused software-defined networking (SAT-SDN) systems, in addition to efforts targeting optical and extremely high frequency (EHF) connectivity for satellites. More specifically, IoST is envisioned as a key enabling technology for a wide variety of transformative applications which are expected to expand the spatial scope of traditional IoT. IoST consists of ground stations called IoST Hubs, the Customer Premises, and the on-Earth sensing devices which form the ground segment, along with the CubeSats and near-Earth sensing devices that form the space segment. The IoST Hubs, on-Earth sensing devices, and Customer Premises communicate with the CubeSats through ground-to-satellite links (GSLs), whereas the inter-satellite links (ISLs) relay information to neighboring CubeSats, in both the same as well adjacent orbits in the exopshere.

The estimation of coverage and connectivity metrics is vital to the constellation design problem. There exist a number of tools that are geared towards constellation coverage and connectivity analysis, with ASTROLIB, REVISIT/COVERIT, and STK representing commonly used options. ASTROLIB and REVISIT/COVERIT are both proprietary tools that are not available to the general public. The former is a software library supporting orbital mechanics, satellite visibility, and general-purpose mathematical functions, while the latter is designed to compute performance metrics such as revisit time, response time, access interval duration, daily visibility time, and daily number of accesses. STK is available as a COTS software tool to the general public and includes several modules for Earth coverage and constellation connectivity calculation. However, it does not integrate well with constellation design optimization frameworks owing to the computation time associated with analysis of large-scale constellations. There are also several open-source tools such as the General Mission Analysis Tool (GMAT), Poliastro, and the JuliaSpace Satellite Toolbox. However, these solutions lack support for metrics such as revisit time and ISL availability.

A majority of existing constellation design frameworks have been limited to a few dozen satellites at best. Additionally, these frameworks are largely centered around commercial software packages and tend to use genetic algorithms.

A small number of satellites is not sufficient for optimized coverage and connectivity within the context of large-scale systems. Catering exclusively to CubeSats, presents a number of constellation designs for global coverage at varying orbital altitudes. To summarize, the following shortcomings tend to be found in existing design solutions: (i) reliance on computation heavy commercial tools, (ii) lack of consideration for connectivity within the constellation, and (iii) absence of solutions for large-scale constellation design.

Therefore, there is a need for a large-scale constellation design framework that can scale well for hundreds of CubeSats.

There is also a need for a rapid prototyping tool for large-scale constellation design.

SUMMARY OF THE INVENTION

The disadvantages of the prior art are overcome by the present invention which, in one aspect, is a computational framework for designing a constellation that includes a plurality of cube satellites (CubeSats) that includes an orbit propagation module, a coverage estimation module, a connectivity estimation module and an annealing module. The orbit propagation module receives a plurality of static parameters for the constellation and determines a position vector, a ground track and sub-satellite points for each of the plurality of CubeSats. The coverage estimation module receives the plurality of static parameters for the constellation and estimates Earth coverage for the constellation. The connectivity estimation module receives the plurality of static parameters for the constellation and determines active inter-satellite links (ISL) in the constellation. The annealing module receives input from the orbit propagation module, the coverage estimation module and the connectivity module and employs an annealing algorithm that generates a constellation design.

In another aspect, the invention is a cube satellite constellation that includes a maximum ISL Range ($d^{RANGE}$) having an constellation configuration that is described as ($x^* = [h^*\ i^*\ n_s^*\ n_p^*\ f_p^*]^T$), where: $h^*$ represents an orbital altitude of the CubeSats in the constellation; $i^*$ represents a orbital inclination of the CubeSats in the constellation; $n_s^*$ represents a number of CubeSats per orbit in the constellation; $n_p^*$ represents a number of orbital planes in the constellation; $f_p^*$ represents a phasing parameter of the constellation; and T represents time.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
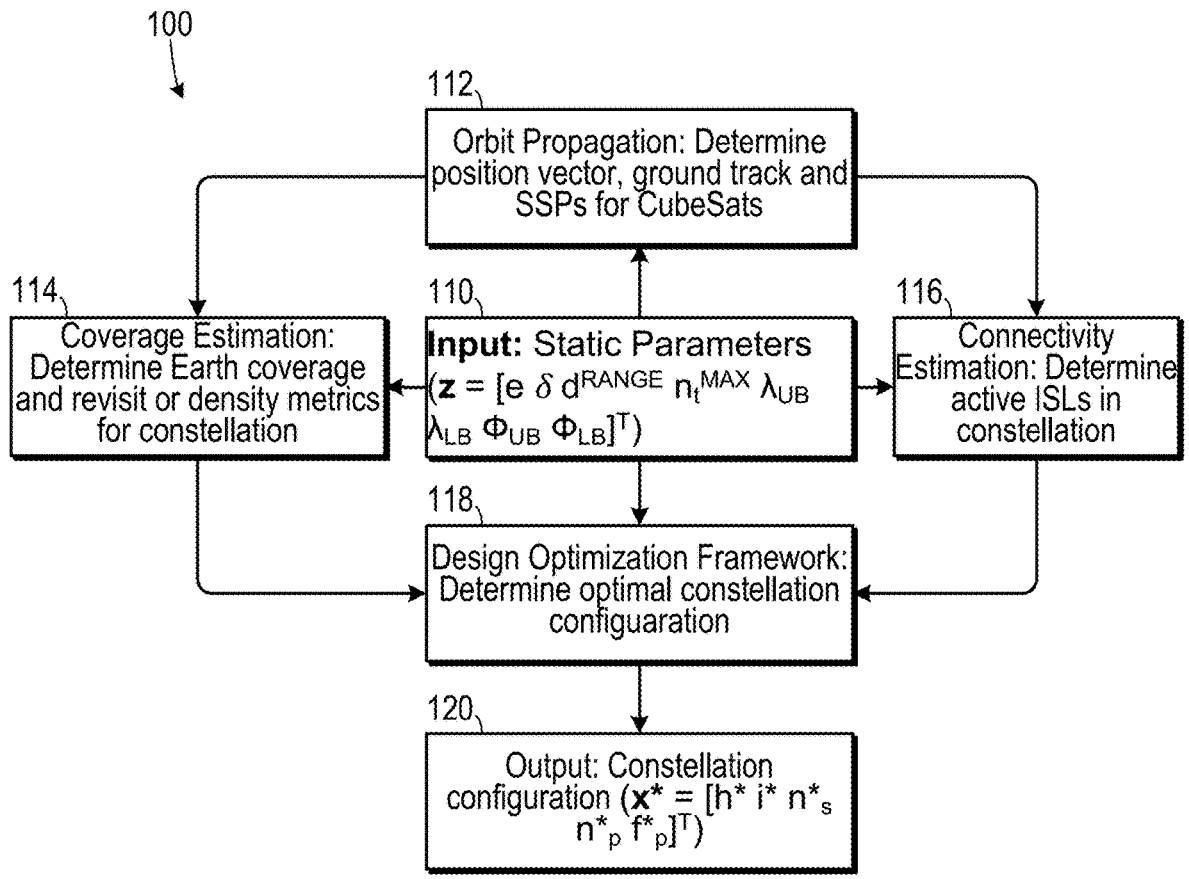
FIG. 1 is a flow chart showing the major modules of the constellation design framework.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

The framework disclosed herein is a highly customizable large-scale constellation design optimization framework for CubeSats. The framework disclosed herein can be used for the design of constellations geared towards either global coverage, latitude-specific coverage, or regional coverage. The framework provides the constellation designer with the freedom to set the desired level of connectivity among the constituent CubeSats, as required.

The design framework implements a fast and accurate orbit propagator that accounts for perturbations arising from the Earth's oblateness through the $J_2$ spherical harmonic coefficient. Robust connectivity characterization is achieved by using the number of active inter-satellite links (ISLs) as the connectivity metric.

Since IoST is limited to the exobase, with a target deployment altitude that ranges from 600 km to 1000 km above the Earth's surface, the maximum possible orbital eccentricity that can be achieved is 0.02, which corresponds to an apogee and perigee radii of 7378 km and 6978 km respectively. Since even the largest possible eccentricity leads to a nearly circular orbit, the optimization framework disclosed herein is intended for the design of circular orbits in particular. Further, it focuses exclusively on designing uniform Walker constellations owing to their vast popularity in the domain of satellite-based IoT and broadband services.

More specifically, it is important to determine: (i) the orbital altitude, (ii) the orbital inclination, (iii) the number of CubeSats per orbital plane, (iv) the number of orbital planes, and (v) the relative phasing between CubeSats in different planes, while minimizing the number of CubeSats in the constellation, and maximizing the coverage and connectivity related metrics. A combinatorial optimization problem of this kind does not admit an easy exact solution, and, therefore, the framework makes use of a simulated annealing (SA) meta-heuristic to obtain an providing an overview of the system architecture along with approximate solution. In doing so, we note that conventional functions are not applicable to the proposed constellation design problem because of additional hidden constraints on system parameters. To this end, we have developed a custom annealing function which ensures that every generated solution set is feasible.

Disclosed herein is a scalable combinatorial optimization framework based on simulated annealing (SA) that provides the optimal orbital altitude, orbital inclination, number of CubeSats per orbit, and number of orbital planes in the constellation, along with the relative phase difference between CubeSats in adjacent planes. Also disclosed herein is a set of constellation designs, each catering to a specific use case, i.e., global, latitude-specific, or region-specific. The highly-customizable large-scale constellation design optimization framework takes into consideration both coverage and connectivity parameters, and adapts to different operational scenarios.

IoST is part of a larger effort to push the boundaries of space systems. The past few years have witnessed advancements in optical connectivity for satellites. Also, recent research efforts have also focused on extending terahertz connectivity to small satellites with new transceiver designs and resource allocation strategies. Patent Publication No. WO 2020/124076 and entitled "Network Employing Cube Satellites" discloses IoST components and is incorporated herein by reference. IoST is envisioned as a key enabling technology for a wide variety of transformative applications which are expected to expand the spatial scope of traditional IoT. IoST includes ground stations called IoST Hubs, the Customer Premises, and the on-Earth sensing devices which form the ground segment, along with the CubeSats and near-Earth sensing devices that form the space segment. The IoST Hubs, on-Earth sensing devices, and Customer Premises communicate with the CubeSats through ground-to-satellite links (GSLs), whereas the inter-satellite links (ISLs) relay information to neighboring CubeSats, in both the same as well adjacent orbits in the exosphere.

Use cases of IoST can be classified into three categories based on functionality as follows:

Monitoring and Reconnaissance: CubeSats equipped with a variety of imaging sensors can be used for monitoring and reconnaissance within IoST. Terrain and asset monitoring is a key application enabled by this use case. Further, reconnaissance capabilities are also vital for disaster monitoring in regions with unstable geology wherein the monitoring of buildings, roads, and bridges is of utmost importance.

In-space Backhaul: an in-space backhaul is of great importance in remote areas that usu-ally lack terrestrial communications infrastructure. Further, IoST can also prove to be particularly useful in ensuring the continuity of critical communications in the case of emergencies such as tornadoes or earthquakes wherein the ground infrastructure might be subject to damage.

Cyber-physical Integration: IoST can be used to achieve cyber-physical integration through a combination of data collected from both local and remote sensors, which is then fed to data analytics frameworks in the cyber space for additional insights. Freight transportation serves as a good example for this use case. Within this context, IoST can leverage aerial reconnaissance for fleet tracking and localized sensors for consignment monitoring. This data can then be delivered to a centralized operations center for real-time processing.

To this end, these use cases necessitate a network architecture that can deliver targeted coverage and robust connectivity. Thus, an optimal constellation design framework is vital to the success of IoST.

As shown in FIG. 1, the constellation design framework 100 disclosed herein follows a modular approach in which the modules receive input 110 of a plurality of static parameters, including ($z = [e \delta d^{RANGE} n_t^{MAX} \lambda_{UB} \lambda_{LB} \Phi_{UB} \Phi_{LB}]^T$), where:

e is an orbital eccentricity of the constellation;

$\delta$ is a minimum elevation angle constraint of the constellation;

$d^{RANGE}$ is a maximum feasible ISL range of the constellation;

$n_t^{MAX}$ is a maximum number of CubeSats in the constellation;

$\lambda_{UB}$ is a longitude upper bound defining a region of interest;

$\lambda_{LB}$ is a longitude lower bound defining the region of interest;

$\Phi_{UB}$ is a latitude upper bound defining the region of interest; and $\Phi_{LB}$ is a latitude lower bound defining the region of interest.

The modules include: an orbit propagation subsystem 112, that determined the position vector, ground track and SSPs for the CubeSats; a coverage and connectivity subsystems module 114, that determines earth coverage and revisit or density metrics for the constellation; a connectivity estimation module 116, that determines active ISLs in the constellation; a design optimization framework 118, that determines optimal constellation configuration; and an output 120 of a constellation configuration expressed as Output: Constellation configuration ($x^* = [h^* i^* n_s^* n_p^* f_p^*]^T$), where h* represents an orbital altitude of the CubeSats in the constellation;

i* represents a orbital inclination of the CubeSats in the constellation;

$n_s^*$ represents a number of CubeSats per orbit in the constellation;

$n_p^*$ represents a number of orbital planes in the constellation;

$f_p^*$ represents a phasing parameter of the constellation; and

T represents time.

Figure 2:
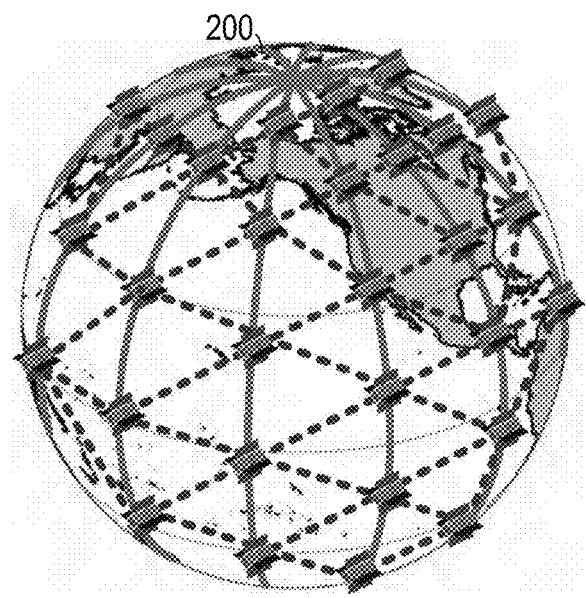
FIG. 2 is a schematic diagram showing a constellation of CubeSats.

Since IoST operates in the exosphere, the maximum possible apogee radius is 7378 km, and minimum feasible perigee radius is 6978 km, leading to a maximum eccentricity of 0.02. Therefore, the system caters to the design of a uniform constellation 200 with circular orbits, i.e., a "Walker constellation," as shown in FIG. 2.

The framework defines three classes of system parameters: design variables (x), internal variables (y), and static parameters (z). The design variables refer to the constellation parameters which are to be optimized, i.e., $x = [h \ i \ n_s \ n_p \ f_p]^T$, representing the orbital altitude, the orbital inclination, the number of CubeSats per orbit, the number of orbital planes, and the phasing parameter of the constellation, respectively. The optimal values of these design variables represent an optimal solution, or more specifically, the optimal constellation configuration. Internal variables are intermediate values derived from operations on design variables. While these variables cannot be controlled directly by the optimization framework, their presence impacts the behavior of the system. Within the context of the constellation design problem, the internal variables are given by $y = [n_t \ \Omega \ v]^T$, representing the total number of CubeSats, i.e., $n_s n_p$, and the right ascension of the ascending node (RAAN) and true anomaly of the constituent CubeSats. The values of the static parameters remain fixed throughout the SA process, where $z = [e \ \delta \ d^{RANGE} \ n_t^{MAX} \ \lambda_{UB} \ \lambda_{LB} \ \varphi_{UB} \ \varphi_{LB}]^T$, represents the orbital eccentricity, minimum elevation angle constraint, maximum feasible ISL range, and maximum number of CubeSats, respectively. Further, $\lambda_{UB}$, $\lambda_{LB}$, $\varphi_{UB}$, and $\varphi_{LB}$ represent the upper and lower bounds on the longitude and latitudes, respectively, defining the region of interest. For example, the parameter set $\lambda_{UB} = 180°$, $\lambda_{LB} = -180°$, $\varphi_{UB} = 90°$ and $\varphi_{LB} = -90°$, corresponds to the global coverage use case. Since the system deals with circular orbits exclusively, e=0. Further, unless stated otherwise, distances used herein refer to orthodromic distances.

Orbit propagation forms a basis of the constellation design framework. The coverage and connectivity estimation modules described herein rely extensively on orbit data such as the CubSats' SSPs and position vectors, and therefore accurate characterization of the satellites' orbital motion is of high importance. Initially, the user defines the orbital elements of a given CubeSat s at time t=0 as [$h_a$ $h_p$ e $\Omega_s(0)$ $\omega_s(0)$ $v_s(0)$], where $h_a$ and $h_p$ represent the apogee and perigee altitude, respectively, and $\omega_s(0)$ represents the argument of perigee at time t=0. Given that, the orbit is circular, $h_a = h_p = h$, and $\omega_s(0) = 0$. The next task is to determine the values of $\Omega_s(t)$, $\omega_s(t)$, and $v_s(t)$ at time t. First, note that the Earth's oblateness causes small persistent variations of the RAAN and argument of perigee, with their respective rates of change being given by:

$$\frac{d\Omega_s}{dt} = -\frac{3J_2 \cos i}{2} \sqrt{\frac{2\mu}{(2R_E + h_a + h_p)^3}} \left( \frac{2R_E}{(2R_E + h_a + h_p)(1 - e^2)} \right)^2, \quad (1)$$

where µ is the standard Earth gravitational parameter, $R_E$ is the Earth's radius, and $J_2$ is the spherical harmonic coefficient describing the Earth's oblateness. Further, $$\frac{d\omega_s}{dt} = \frac{3J_2(5\cos^2 i - 1)}{4}\sqrt{\frac{2\mu}{(2R_E+h_a+h_p)^3}}\left(\frac{2R_E}{(2R_E+h_a+h_p)(1-e^2)}\right)^2. \quad (2)$$

Orbit Propagation Subsystem: In order to obtain the true anomaly at time t, we first make use of Kepler's equation [46, § 4.2] to obtain the mean anomaly, Ms(0), at t=0 as: given by:

$$M_s(0) = E_s(0) - e\sin(E_s(0)), \quad (3)$$

where $E_s(0)$ is the eccentric anomaly for CubeSat s at time t=0 given by:

$$E_s(0) = \arctan2\left(\frac{\sqrt{1-e^2}\sin(v_s(0))}{1+e\cos(v_s(0))}, \frac{e+\cos(v_s(0))}{1+e\cos(v_s(0))}\right). \quad (4)$$

Then, the mean anomaly at time t can be calculated as:

$$M_s(t) = M_s(0) + t\sqrt{\frac{2\mu}{(2R_E+h_a+h_p)^3}}, \quad (5)$$

followed by the use of Equation (3) along with an iterative method, such as Newton's method, to solve for $E_s(t)$. Finally, the true anomaly at time t, vs(t), can be obtained from $E_s(t)$ using Equation 4.

Using the trajectory equation [46, § 2.2], we can express the magnitude of the position vector at time t, r(t), for a given CubeSat s as:

$$r_s(t) = \frac{a(1-e^2)}{1+e\cos(v_s(t))}, \quad (6)$$

with the position vector in the perifocal coordinate (PQW) system being given by:

$$r_s(t) = \begin{bmatrix} r_s(t)\cos(v_s(t)) \\ r_s(t)\sin(v_s(t)) \\ 0 \end{bmatrix}, \quad (7)$$

followed by a conversion to the Earth-centered inertial (ECI) coordinate frame through the following rotation matrix:

$$\left[\frac{ECI}{PQW}\right] = R_3 R_2 R_1, \quad (8)$$

where $$R_1 = \begin{bmatrix} \cos(\omega_s(t)) & -\sin(\omega_s(t)) & 0 \\ \sin(\omega_s(t)) & \cos(\omega_s(t)) & 0 \\ 0 & 0 & 1 \end{bmatrix}, \quad (9)$$

$$R_2 = \begin{bmatrix} 1 & 0 & 1 \\ 0 & \cos(i) & -\sin(i) \\ 0 & \sin(i) & \cos(i) \end{bmatrix}, \quad (10)$$

and $$R_3 = \begin{bmatrix} \cos(\Omega_s(t)) & -\sin(\Omega_s(t)) & 0 \\ \sin(\Omega_s(t)) & \cos(\Omega_s(t)) & 0 \\ 0 & 0 & 1 \end{bmatrix}. \quad (11)$$

The next step involves transforming the ECI coordinates to the evaluating several constellations at an extremely rapid rate. To Earth-centered, Earth-fixed (ECEF) coordinate system. In doing this end, we note that our orbit propagator achieves performance so, we have used the J2000 ECI frame of reference [46] along that is similar to STK in terms of accuracy even in the worst—with a modified Julian date-based Greenwich mean sidereal time (GMST) calculation. The corresponding rotation matrix is given by:

$$\left[\frac{ECEF}{ECI}\right] = \begin{bmatrix} \cos(\omega_E t + \theta(t)) & -\sin(\omega_E t + \theta(t)) & 0 \\ \sin(\omega_E t + \theta(t)) & \cos(\omega_E t + \theta(t)) & 0 \\ 0 & 0 & 1 \end{bmatrix}. \quad (12)$$

where $\theta(t)$ is the GMST for instance t, and $\omega_E$=72.9115 µrad/s is the Earth's rotation rate based on the WGS84 model. The ECEF value of the position of CubeSat s at time t is converted to the geodetic longitude, $\lambda_s(t)$, and geodetic latitude, $\varphi_s(t)$, of the corresponding SSP, $p_s(t)$.

Coverage Estimation Subsystem: coverage estimation is a key component of the constellation design framework, with average revisit time, percentage of time covered, average access duration, etc., representing the classical coverage metrics. However, the computation of these metrics is time consuming, and serves as one of the major pitfalls of existing tools. Instead, the system employs an alternate approach based on the concept of spherical Voronoi tessellations, CubeSat revisit frequency, and SSP density. This method can scale well for hundreds, and potentially thousands, of CubeSats.

Figure 3:
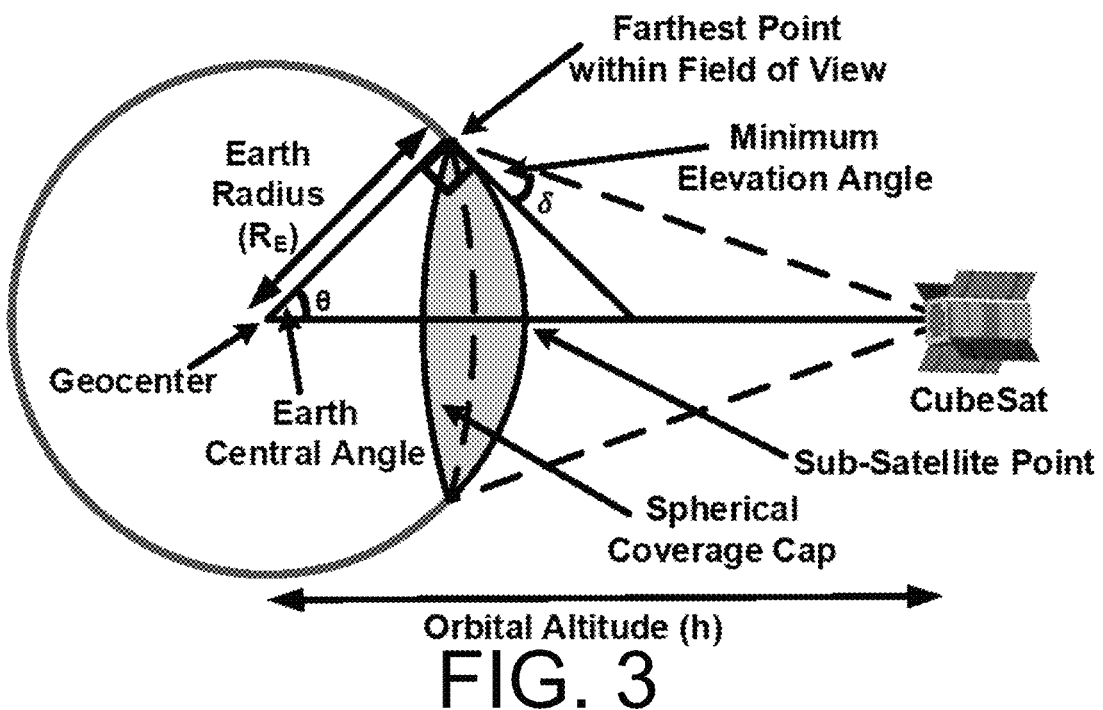
FIG. 3 is a diagram showing elements of CubeSat coverage geometry.

Initially, the system defines the spherical radius $d^{RAD}$, of the spherical cap subtended by CubeSat s on the earth's surface. Since the system deals with circular orbits $d_s^{RAD}=d^{RAD}$ $\forall$ s $\in \{1, 2, \ldots n_t\}$, i.e., all CubeSats in the constellation have the same spherical radius, where $d^{RAD}=RE(\theta)$. Within this context, $R_E$ is the Earth's radius, and $$\theta = \pi/2 - \delta - \arcsin\left(\frac{R_E}{R_E+h}\cos\delta\right), \quad (13)$$

is the Earth central angle subtended by the CubeSat at the geocenter. The result in (13) follows from the application of the law of sines to the triangle formed by the CubeSat, the farthest point within its field of view, and the geocenter, as shown in FIG. 3, under the assumption that the Earth is a perfect sphere. Further, we note that the set of SSPs at time t, $p(t):=\{ps(t)\}^{n_t}_{s=1}$ serves as a finite collection of $n_t$ distinct generators over the spherical metric space $\mathbb{X}$ defined by the Earth's surface. It follows that the set $$\mathfrak{V}\mathfrak{D}_s(t) := \{p(t) \in \mathbb{X} \mid \forall s \neq k : dist(p(t), p_s(t)) \leq dist(p(t), p_k(t))\}, \quad (14)$$

is the spherical Voronoi region associated with SSP ps(t), and thus CubeSat s at time t. The corresponding Voronoi diagram for all $n_t$ CubeSats is thus given by $\mathfrak{VD}(t)$.

Figure 4:
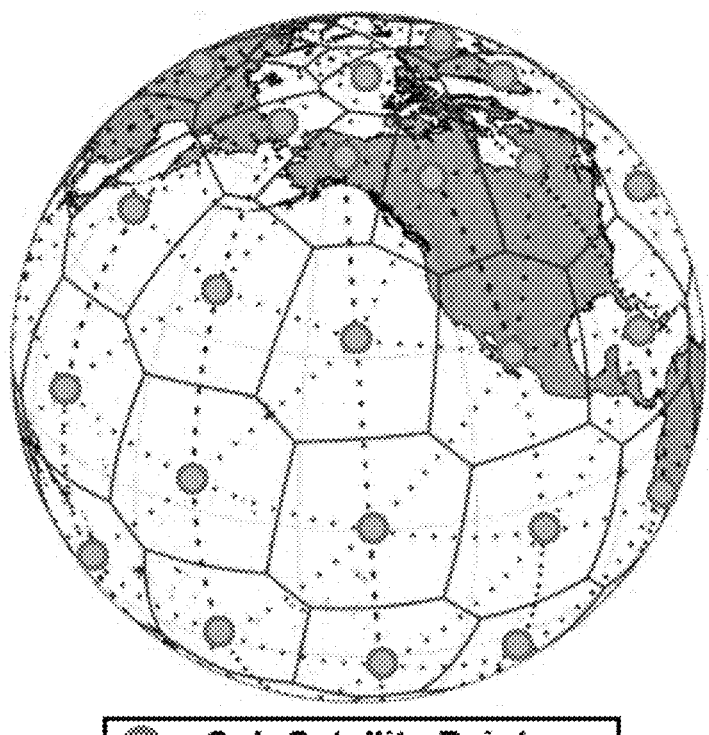
FIG. 4 is a Voronoi diagram with a Delaunay triangulation formed by sub-satellite points superimposed thereon.

Further, in order to better quantify the Earth coverage achieved by the constellation, we introduce the dual of the spherical Voronoi diagram, known as the spherical Delaunay triangulation, $\mathfrak{DT}(t)$. The Delaunay triangulation is obtained by connecting with a line segment any two points $\mathfrak{p}_s(t)$ and $\mathfrak{p}_k(t) \in \mathfrak{p}(t)$ for which a circle C(t) exists that passes through $\mathfrak{p}_s(t)$ and $\mathfrak{p}_k(t)$, and does not contain any other points of $\mathfrak{p}(t)$ in its interior or boundary. Using the representative constellation shown in FIG. 2, for some given time t, we are able to obtain the corresponding $\mathfrak{VD}(t)$ and $\mathfrak{DT}(t)$ as shown in FIG. 4. More generally, the framework uses the STRIPACK algorithm to generate the spherical Voronoi diagram and Delaunay triangulations associated with a set of SSPs.

Based on the Voronoi diagram and Delaunay triangulation concepts, we introduce the following Lemma 1 for coverage characterization:

Lemma 1. Continuous coverage over a region of interest can be guaranteed if the radius of the spherical cap subtended by any given CubeSat exceeds the maximum radius of the spherical circles that circumscribe the Delaunay triangulation of those SSPs that lie within said region for every time instant under consideration.

Proof. The proof follows from the fact that the circumcenters of Delaunay triangles in $\mathfrak{DT}(t)$ are the vertices of the spherical Voronoi regions in $\mathfrak{VD}(t)$, and the vertices of the Delaunay triangles in $\mathfrak{DT}(t)$ are the generators of the Voronoi regions in $\mathfrak{VD}(t)$. Consequently, the radius of any such circumcircle will be given by the distance between an SSP $p_s(t)$ and one of the vertices of the region $\mathfrak{VD}(t)$. Therefore, if the radius of the spherical coverage cap exceeds all such distances for the region under consideration, continuous coverage over that region can be guaranteed. Conversely, if the system exhibits continuous coverage, it implies that the radius of any given spherical coverage cap exceeds the maximum possible spherical circle radius within the region of interest.

The result above can be readily extended to account for global coverage. Thus, we have Corollary 1 for global coverage characterization.

Corollary 1. For every time instant t, global coverage can be guaranteed if the radius of every spherical circle that circumscribes the Delaunay triangulation $\mathfrak{DT}(t)$ of the set of SSPs $p(t)$ is less than or equal to the radius of the spherical coverage cap $d^{RAD}$.

Proof. The result follows from Lemma 1 by expanding the region of interest to include the entire surface of the Earth.

| Algorithm 1 Voronoi Coverage Estimation |
|---|
| 1:   for t ← 1 to $n_{TIME}$ do |
| 2:     $f_{COV}$ (x, y, z, t) ← 0 |
| 3:     $\mathfrak{VD}(t)$ ← STRIPACK($\lambda(t), \varphi(t)$) |
| 4:     for s ← 1 to $n_t$ do |
| 5:       if $\lambda_{LB} \leq \lambda_s(t) \leq \lambda_{UB}$ & $\phi_{LB} \leq \phi_s(t) \leq \phi_{UB}$ then |
| 6:         $\lambda_{\mathfrak{VD}_s}(t) \leftarrow \lambda_{LB}\ \forall\ \lambda_{\mathfrak{VD}_s}(t) \leq \lambda_{LB}$ |
| 7:         $\lambda_{\mathfrak{VD}_s}(t) \leftarrow \lambda_{UB}\ \forall\ \lambda_{\mathfrak{VD}_s}(t) \geq \lambda_{UB}$ |
| 8:         $\phi_{\mathfrak{VD}_s}(t) \leftarrow \phi_{LB}\ \forall\ \phi_{\mathfrak{VD}_s}(t) \leq \phi_{LB}$ |
| 9:         $\phi_{\mathfrak{VD}_s}(t) \leftarrow \phi_{UB}\ \forall\ \phi_{\mathfrak{VD}_s}(t) \geq \phi_{UB}$ |
| 10:        $d^{MAX} = \max_{1 \leq k \leq |V(\mathfrak{VD}_s(t))|}$ (distance(s, k)) |
| 11:       if $d^{RAD} \geq d^{MAX}$ then |
| 12:         $f_{COV}(\cdot) \leftarrow f_{COV}(\cdot) + 1$ |
| 13:       else |
| 14:         $f_{COV}(\cdot) \leftarrow f_{COV}(\cdot) + (d^{RAD}/d^{MAX})^2$ |
| 15:       end if |
| 16:     end if |
| 17:     end for |
| 18:     $f_{COV}(\cdot) \leftarrow f_{COV}(\cdot)/n_t$ |
| 19:   end for |

Accordingly, the Voronoi coverage parameter, $f_{COV}$ (x, y, z, t) can be calculated in accordance with the procedure outlined in Algorithm 1 (above), where $\lambda(t) := \{\lambda_s(t)\}_{s=1}^{n_t}$, $\varphi(t) := \{\varphi_s(t)\}_{s=1}^{n_t}$, $n_{TIME}$ refers to the time instances under consideration, and $V(\mathfrak{VD}(t))$ represents the set of vertices of the diagram corresponding to CubeSat s at time t. The geodetic longitude and latitude values for these vertices are expressed as $\lambda_{\mathfrak{VD}_s}(t)$ and $\varphi_{\mathfrak{VD}_s}(t)$. First, Algorithm 1 uses the STRIPACK subroutine to obtain the Voronoi diagram, $\mathfrak{VD}(t)$, associated with $SSP_s$ $p(t) = (\lambda(t), \varphi(t))$. Next, the algorithm filters out non-relevant SSP by checking whether the SSP for each CubeSat $s \in \{1, 2, \ldots, n_t\}$ lies within the region of interest set by the constellation designer. For an SSP that lies within the region of interest, the associated Voronoi vertices are adjusted further, if required, to bring them within the region under consideration. Then, the algorithm calculates the maximum distance between the SSP and its associated Voronoi vertices. If $d^{RAD}$ exceeds this distance, then the region is covered completely, if not, then the proportion of the region under coverage is given by the square of the ratio of the two distances. Once this calculation has been performed for all nt CubeSats, the result is normalized by the number of CubeSats in the constellation. To summarize, Algorithm 1 realizes Earth coverage as a ratio of the square of the radius of the spherical coverage cap to that of the spherical circles that circumscribe the obtained Delaunay triangulation.

Further, as part of the coverage characterization, we obtain the CubeSat revisit frequency, $f_{REV}(x, y, z, \varphi)$, based on the former tracks the number of CubeSats that are within the following procedure $$F_1(\phi) = \begin{cases} \operatorname{sgn}(\phi - \theta), & \text{if } i = 0; \\ \operatorname{sgn}(\pi/2 - \theta - \min(i, \pi/2 - i)), & \text{if } \phi = \pi/2; \\ \dfrac{-\sin\theta + \sin\phi\cos i}{\cos\phi\sin i}, & \text{otherwise,} \end{cases} \quad (15)$$

$$F_2(\phi) = \begin{cases} 1, & \text{if } i = 0 \text{ or } \phi = \pi/2; \\ \dfrac{\sin\theta + \sin\phi\cos i}{\cos\phi\sin i}, & \text{otherwise,} \end{cases} \quad (16)$$

$$F(\phi) = \frac{1}{\pi}(\arccos\{\min[1, \max(-1, F_1(\phi))]\} - \arccos\min[1, F_2(\phi)]), \quad (17)$$

$$F_{REV}(x, y, z, \phi) = \left(1 - \frac{2\pi\sqrt{(R_E + h)^3/\mu}}{T}\cos i\right) F(\phi), \quad (18)$$

where T is the duration of one solar day. A combination of $f_{COV}(x, y, z, t)$ and $f_{REV}(x, y, z, \varphi)$ works well in practice for the purpose of coverage characterization. The former quantifies Earth coverage in terms of surface area, while the latter describes coverage in terms of CubeSat availability. These coverage metrics, i.e., $f_{COV}(\cdot)$ and $f_{REV}(\cdot)$, can be used to design a coverage-optimized constellation to demonstrate the practicality of the proposed metrics.

Simultaneously, note that $f_{REV}(x, y, z, \varphi)$ is a latitude-centric metric, and therefore well-suited for use cases where the focus is on either global or latitude-specific coverage. However, $f_{REV}(x, y, z, \varphi)$ cannot be used when designing constellations for use cases that require region-specific coverage, since it only provides us with information about the revisit statistics associated with a given latitude, as opposed to a specific geodetic point.

Consequently, we introduce $f_{DEN}(x, y, z, t)$ for region-specific scenarios, representing the SSP density within the region of interest at time t. In doing so, we first define indicator variable $$\alpha_s(t) \; \forall \, s \in \{1, 2, \ldots, n_t\}, t \in (1, 2, \ldots, n_{TIME}\} \text{ such that} \quad (19)$$

$$\alpha_s(t) = \begin{cases} 1, & \text{if } \lambda_{LB} \leq \lambda_s(t) \leq \lambda_{UB}, \text{ and} \\ & \phi_{LB} \leq \phi_s(t) \leq \phi_{UB}; \\ 0, & \text{otherwise,} \end{cases}$$

then, $f_{DEN}(x, y, z, t)$ can be obtained as $$f_{DEN}(x, y, z, t) = \frac{\sum_{s=1}^{n_t} \alpha_s(t)}{n_t}. \quad (20)$$

For region-specific coverage scenarios, $f_{DEN}(x, y, z, t)$ works well in tandem with $f_{COV}(x, y, z, t)$, because while the former tracks the number of CubeSats that are within the region of interest over time, the latter describes the coverage of the CubeSats under consideration.

While Lemma 1 provides an analytical justification regarding the efficacy of the coverage estimation subsystem, in order to further reinforce its validity, we demonstrate the impact of optimizing for coverage using a small-scale constellation. The primary idea here is to compare the coverage metrics of a constellation that is obtained by leveraging the proposed coverage estimation subsystem, against other similarly sized constellations that target global coverage. More specifically, using the framework described in Section V with weights w1=w4=0, we attempt to obtain a candidate constellation, not exceeding 80 CubeSats, that has been designed for optimal coverage. For the purpose of comparison, we have chosen the Iridium NEXT and Astrocast constellations, since both aim to achieve global coverage, and contain a similar number of satellites, at 66 and 64 respectively. Our design optimization framework provides the following coverage-optimized constellation configuration: $[899.674 \; 84.664 \; 13 \; 6 \; 1]^T$, i.e., a total of 78 CubeSats arranged in 6 orbits of 13 CubeSats each, at an altitude of 899.674 km with an inclination of 84.664°. A cursory examination of the obtained constellation parameters suggests that our framework proposes a marginal increases in the number of satellites, from 66 to 78, and a 15% increase in the orbital altitude from 780 km to 899 km, when compared to Iridium NEXT.

In order to quantify the impact of this change on constellation performance, we compare coverage-related metrics, such as percentage coverage and revisit time, with those of Iridium NEXT and Astrocast. We noted that the coverage optimized constellation provides a significant 30% improvement in coverage over the Iridium NEXT constellation, achieving over 90% Earth coverage over the 24 h observation period. Of particular note is the result wherein it has been demonstrated that with the coverage optimized constellation, any given region has a minimum of at least 81% coverage, a substantial improvement over the 51% offered by Iridium, and the 21% offered by Astrocast. Further, we also compare the revisit time metrics across all three constellations, with the intention of the demonstrating that the coverage metrics proposed by us lead to a marked improvement in the revisit time performance of the constellation. The results have been obtained using STK, and we note that the optimized coverage constellation offers a significant improvement over both Astrocast and Iridium NEXT, achieving less than one-sixth and one-half of their respective average revisit times.

In this manner, we have demonstrated the efficacy of the proposed coverage estimation subsystem of our framework. In particular, the use of the coverage estimation subsystem in designing constellations leads to a guaranteed improvement in coverage performance.

Connectivity Estimation Subsystem: Connectivity estimation is vital from a data communications perspective. Within the context of system design, we are interested in the ISL density of the constellation, i.e., the ratio of the number of active ISLs at any given point in time, to the ideal number of ISLs as defined in the system specifications. The higher the ISL density, the more robust will be the connectivity. Expectedly, a higher ISL density requires a larger number of CubeSats and a longer communication range. However, from a system optimization perspective, we are trying to minimize the number of satellites in the constellation, and therefore a trade-off exists between connectivity and the number of CubeSats. As part of the connectivity estimation subsystem, we first determine the maximum number of ISLs in the constellation at time t, $n_{ISL}^{MAX}(t)$. In doing so, we introduce the variable $n_{REG}(t) = \sum_{s=1}^{n_t} \alpha_s(t) \forall t \in \{1, \ldots, n_{TIME}\}$ which represents the number of CubeSats with SSPs that lie within the region of interest, with $$n_{ISL}^{MAX}(t) = \frac{n_{REG}(t)(n_{REG}(t) - 1)}{2}. \quad (21)$$

Figure 5:
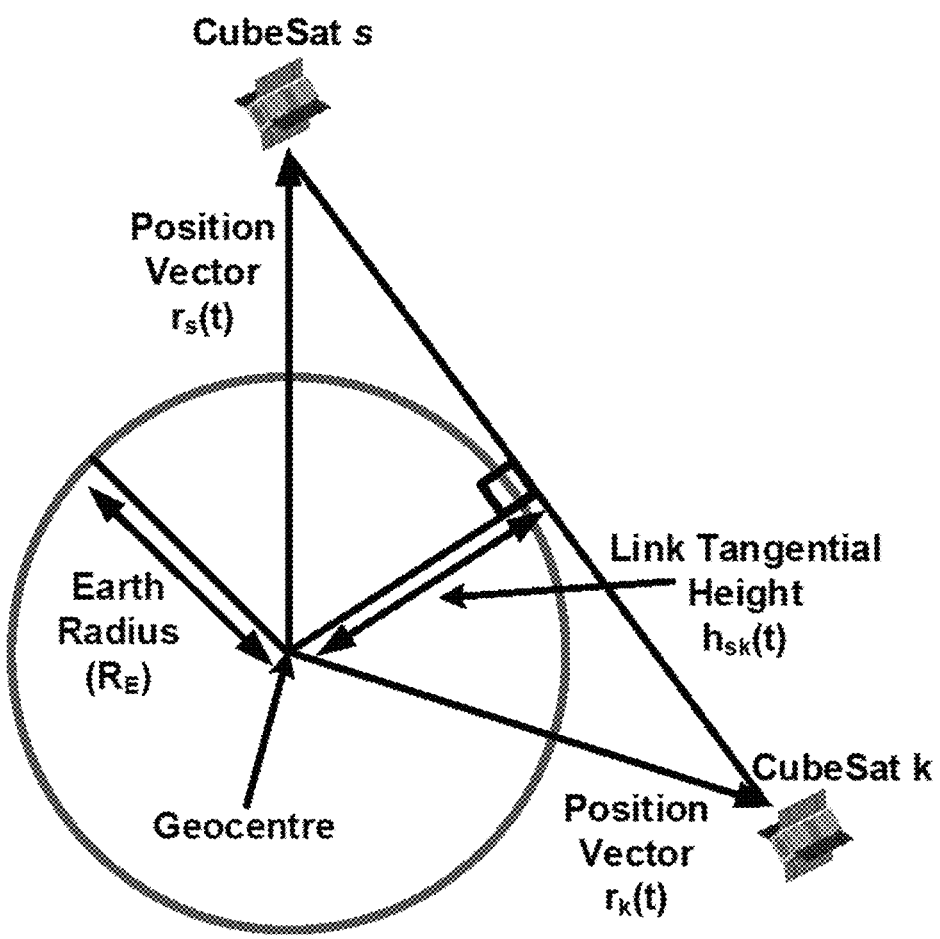
FIG. 5 is a diagram that demonstrates inter-satellite link visibility.

However, it is not practically feasible to have $n_{ISL}^{MAX}(t)$ ISLs active at all times, due to factors that impact ISL availability such as CubeSat visibility and communication range. Instead, the ideal number of ISLs at time t is expressed as $n_{ISL}(t) = \beta n_{ISL}^{MAX}(t)$, where $0 \leq \beta \leq 1$ is the constellation connectivity parameter. We leave the choice of $\beta$ to the system designer, depending on the kind of connectivity required. Further, in order to quantify CubeSat visibility for any two CubeSats s and k, with s≠k, we note that if the angle between their respective position vectors, $r_s(t)$ and $r_j(t)$, is an acute angle, then the two CubeSats are visible to each other. On the other hand, as shown in FIG. 5, if this angle is obtuse, then the associated link tangential height $h_{ij}(t)$, must be at least greater than the radius of the Earth in order to ensure visibility. More formally, we introduce indicator variable $\gamma sk(t) \forall s, k \in \{1, 2, \ldots, nt\}, t \in \{1, 2, \ldots, n_{TIME}\}$ such that $$\gamma_{sk}(t) = \begin{cases} 1, & \text{if } r_s(t) \cdot r_k(t) \geq 0; \\ 1, & \text{if } r_s(t) \cdot r_k(t) < 0, \text{ and} \\ h_{sk}(t) = \frac{|r_s(t) \times r_k(t)|}{|r_s(t) - r_k(t)|} \geq R_E; \\ 0, & \text{otherwise.} \end{cases} \quad (22)$$

The second parameter that influences ISL feasibility is the distance between the CubeSats, i.e., if the distance between any two CubeSats exceeds the maximum communication range, a link cannot be established. Accordingly, we introduce the indicator variable $d_{sk}(t) \forall s, k \in \{1, 2, \ldots, nt\}, t \in \{1, 2, n_{TIME}\}$ as follows:

$$d_{sk}(t) = \begin{cases} 1, & \text{if } dist(i, j) \leq d^{RANGE} \text{ at time } t; \\ 0, & \text{otherwise.} \end{cases} \quad (23)$$

We note that the value of $d^{RANGE}$ is a function of the link budget, and thus depends upon a variety of factors ranging from the transmit power and frequency bands in use, to the channel model and the antenna design of the CubeSat. With a view to keeping the framework flexible, we prefer to use the generic parameter $d^{RANGE}$, instead of specifying the link budget. The idea here is that the system designer can calculate the radio communication range specific to their scenario and simply substitute the appropriate value for $d^{RANGE}$. Further, with $\gamma_{sk}(t)$ and $d_{sk}(t)$ defined, we utilize Algorithm 2 (below) to obtain the connectivity metric $f_{ISL}(x, y, z, t)$, which represents the ratio of the active ISLs to the ideal number of ISLs at time t. In particular, for every time instance t, for every CubeSat s that lies within the region of interest, Algorithm 2 checks the connectivity with every other CubeSat k based on: (i) the target Cubesat's location ($\alpha_k(t)$); (ii) the target CubeSat's visibility ($\gamma_{sk}(t)$); and (iii) the distance to the target CubeSat ($d_{sk}(t)$). The number of ISLs thus obtained are then normalized with respect to the ideal number of ISLs at time t, $n_{ISL}(t)$.

| Algorithm 2 ISL Connectivity Estimation | |
|---|---|
| 1: | for t ← 1 to $n_{TIME}$ do |
| 2: | $f_{ISL}$ (x, y, z, t) ← 0 |
| 3: | if $n_{ISL}(t) > 0$ then |
| 4: | for s ← 1 to $n_t - 1$ do |
| 5: | if $\alpha_s(t) = 1$ then |
| 6: | for j ← i + 1 to $n_t$ do |
| 7: | if $\alpha_k(t)\gamma_{sk}(t)d_{sk}(t) = 1$ then |
| 8: | $f_{ISL}(\cdot) \leftarrow f_{ISL}(\cdot) + 1$ |
| 9: | end if |
| 10: | end for |
| 11: | end if |
| 12: | end for |
| 13: | $f_{ISL}(\cdot) \leftarrow f_{ISL}(\cdot)/n_{ISL}(t)$ |
| 14: | end if |
| 15: | end for |

Design optimization framework: Having described the key subsystems in the preceding sections, we now turn our attention to the large-scale constellation design problem formulation.

Problem formulation: We note that the static parameters $z = [e \ \delta \ d^{RANGE} \ n_t^{MAX} \ \lambda_{UB} \ \lambda_{LB} \ \varphi_{UB} \ \varphi_{LB}]^T$ serve as input to the system. Since the framework is specifically concerned with circular orbits, $e=0$. Given input z, and the coverage and connectivity related metrics from the respective subsystems, we need to determine the optimal value of the design variables, $x^* = [h^* \ i^* \ n_s^* \ n_p^* \ f_p^*]^T$, which will characterize the optimal constellation configuration. In order to so, we need to define the objective function $G(x, y, z)$, which takes into consideration: (i) the number of CubeSats in the constellation, (ii) the coverage metrics, and (iii) the connectivity metric.

First, we introduce G1(x, y, z) to reflect the constellation density as follows $$G_1(x, y, z) = \frac{n_s n_p}{n_t^{MAX}}. \quad (24)$$

Constellation density is an important metric as it helps control the number of CubeSats in the constellation. Next, we consider the Voronoi coverage metric, $G_2(x, y, z)$, as $$G_2(x, y, z) = \left(1 - \frac{\sum_{t=1}^{n_{TIME}} w_{COV}(t) f_{COV}(x, y, z, t)}{n_{TIME}}\right), \quad (25)$$

where nTIME refers to the time steps under consideration. The weights $0 \leq wCOV(t) \leq 1 \ \forall t \in \{1, 2, \ldots, nTIME\}$, with $0 \leq wCOV(t) \leq 1$, allow us to tune the coverage for specific times of the day, if required. Further, if the use case under consideration requires either global or latitude-specific coverage, the revisit metric, $G^G_3(x, y, z)$, is given by $$G^G_3(x, y, z) = \left(1 - \frac{\sum_{\phi=-90°}^{90°} w_{REV}(\phi) f_{REV}(x, y, z, \phi)}{n_{LAT}}\right), \quad (26)$$

where nLAT=181 refers to the number of latitudes under consideration, and $0 \leq w_{REV}(\varphi) \leq 1 \forall \varphi \in [-90 \ 90]$, with $0 \leq \Sigma_\phi \omega_{REV}(\phi) \leq 1$. On the other hand, for regional coverage requirements, where $f_{REV}(\cdot)$ is replaced by the SSP density parameter, we have $$G^R_3(x, y, z) = \left(1 - \frac{\sum_{t=1}^{n_{TIME}} w_{DEN}(t) f_{DEN}(x, y, z, t)}{n_{TIME}}\right), \quad (27)$$

with $0 \leq wDEN(t) \leq 1 \ \forall t \in \{1, 2, \ldots, n_{TIME}\}$, and XXX. Since $G_3(\cdot)$ can either take value $G^G_3(\cdot)$ or $G^R_3(\cdot)$, but not both for the same coverage scenario, we introduce an indicator variable g such that $$g = \begin{cases} 1, & \text{if } \lambda_{LB} = -180° \text{ and } \lambda_{UB} = 180°; \\ 0, & \text{otherwise,} \end{cases} \quad (28)$$

with $G_3(\cdot) = (1-g)G^G_3(\cdot) + G^R_3(\cdot)$. Finally, we have the ISL connectivity metric, $G_4(x, y, z)$, as $$G_4(x, y, z) = \left(1 - \frac{\sum_{t=1}^{n_{TIME}} w_{ISL}(t) F_{ISL}(x, y, z, t)}{n_{TIME}}\right), \quad (29)$$

with $0 \leq w_{ISL}(t) \leq 1 \forall t \in \{1, 2, \ldots, n_{TIME}\}$ and $0 \leq \Sigma_t \omega_{ISL}(t) \leq 1$. The objective function can then be expressed as $$G(x, y, z) = \quad (30)$$
$$w_1 G_1(x, y, z) + w_2 G_2(x, y, z) + w_3 G_3(x, y, z) + w_4 G_4(x, y, z).$$

We have chosen a weighted summation of the different metrics in order to obtain a single objective in the interest of computational speed. The weights $w_1$, $w_2$, $w_3$, and $w_4$, are intended to allow for flexibility in the prioritization of different metrics, with $0 \leq w_1, w_2, w_3, w_4 \leq 1$, and $0 \leq w_1+w_2+w_3+w_4 \leq 1$. If required, the system designer can choose to optimize for each metric individually by setting the other weights to 0. Further, we note that $$\eta = \frac{1}{G(\cdot)}$$

represents the constellation quality metric which is a focal point of the performance comparison.

Next, in order to define the problem constraints, we note that the minimum number of satellites per orbital plane and minimum number of orbital planes can be obtained as $n_s^{MIN}=\lceil 2\pi/(2\theta) \rceil$ and $n_p^{MIN}=\lceil 2\pi/(4\theta) \rceil$, respectively. Additionally, we also provision for constraints on the orbital altitude and inclination, with $h^{MAX}$ and $h^{MIN}$ representing the bounds on the orbital altitude, and $i^{MAX}$ and $i^{MIN}$ quantifying the bounds on the inclination. With this, the constellation design problem can be defined as follows.

Definition 1: Large-scale Constellation Design Problem (LsCD): Given a set of static parameters of the form $z=[e\ \delta\ d^{RANGE}\ n_t^{MAX}\ \lambda_{UB}\ \lambda_{LB}\ \varphi_{UB}\ \varphi_{LB}]^T$, use the internal variables $y=[n_t\ \Omega\ v]^T$, and system metrics $f_{COV}(\cdot)$, $f_{REV}(\cdot)$, $f_{DEN}(\cdot)$, and $f_{ISL}(\cdot)$ to determine the optimal large-scale constellation configuration given by $x^*=[h^*\ i^*\ n_s^*\ n_p^*\ f_p^*]^T$. More formally, $$\text{Given: } z = [e\ \delta\ d^{RANGE}\ n_t^{MAX}\ \lambda_{UB}\ \lambda_{LB}\ \phi_{UB}\ \phi_{LB}]^T, n_s^{MIN}, n_p^{MIN}$$

$$\text{Find: } x = [h\ i\ n_s\ n_p\ f_p]^T$$

$$\text{Minimize: } G(x, y, z)$$

$$\text{Subject to } \begin{cases} 0 \leq w_1 + w_2 + w_3 + w_4 \leq 1, \\ h^{MIN} \leq h \leq h^{MAX}, \\ i^{MIN} \leq i \leq i^{MAX}, \\ n_s^{MIN} \leq n_s, \\ n_p^{MIN} \leq n_p, \\ 0 \leq f_p \leq n_p - 1, \\ n_t \leq n_t^{MAX}, \end{cases}$$

where $0 \leq w_1, w_2, w_3, w_4 \leq 1$, $h, i \in \mathbb{R}$, and $n_s, n_p, f_p \in \mathbb{Z}$. LsCD represents a non-linear combinatorial optimization problem with a complicated structure that does not admit an easy solution. To this end, we leverage meta-heuristic methods for solving the LsCD problem. In particular, we take into consideration simulated annealing (SA), which is a single-state method, and genetic algorithms (GA), which belong to the class of meta-heuristics known as population methods. In comparing the two, we note that a variant of SA known as Adaptive Simulated Annealing (ASA) is demonstrably more efficient than GA-based methods. In particular, for a problem dimension equal to that of LsCD, it has been shown that ASA is an order of magnitude faster than GA. This result is of increased significance when we consider the size of the LsCD solution space. Therefore, we solve LsCD using the ASA method.

Simulated Annealing: The SA algorithm draws upon the analogy between the annealing process used in metallurgy and the problem of solving large combinatorial optimization programs. Within the context of metallurgy, annealing denotes the physical process in which a solid material, placed in a heat bath, is heated by increasing the temperature of the heath bath to a certain maximum value. At this stage, the solid is in a liquid state, characterized by the random arrangement of its particles. The material is then cooled slowly by lowering the temperature of the heat bath. As the temperature is lowered and the material cools down, the constituent particles arrange themselves in a state of minimal internal energy, provided that the maximum temperature is sufficiently high, and that the cooling is carried out sufficiently slowly. If care is not taken to control the cooling rate, the solid will settle down in a meta-stable state with non-minimal internal energy. Thus, the system temperature controls the state transitions. At higher temperatures the material can freely transition to states of higher energy, allowing the system to escape locally minimal energy states, and move towards the global minimum state. However, as the temperature is lowered, the material can only transition to increasingly lower energy states, eventually settling down in the minimal energy state.

Algorithmically, at each annealing temperature $\Gamma_k$, a new solution $x_{k+1}$, i.e., a new state, is generated at random based on an annealing function, and the acceptance of this state is based on the Metropolis criterion and an acceptance probability $\mathbb{P}(x_{k+1})$. More specifically, if the change in the objective function, $G(x_{k+1}, y_{k+1}, z) - G(x_k, y_k, z)$, is negative, then it implies that $x_{k+1}$ is a better solution than $x_k$ and should be accepted as such. However, if this difference is positive, then $x_{k+1}$ is a worse solution, and its acceptance depends upon $\mathbb{P}(x_{k+1}) \leq r$, where $r \in \mathbb{U}(0, 1)$. At higher temperatures, the system can freely move from a lower energy state, i.e., lower objective value, to a higher energy state, allowing the system to effectively escape local minima. Eventually, as the temperature is reduced in accordance with a cooling schedule, these state transitions reduce, and the system settles down to a minimum energy state, signifying that an approximate solution to the problem has been found.

Within the context of the LsCD problem, we note that conventional annealing functions are not applicable for two reasons: (i) the upper bound on the design variable $f_p$ is not static, and instead depends on $n_p$, and (ii) there exists an upper bound on the internal variable $n_t$, of the form $n_t \leq n_t^{MAX}$. Therefore, we make use of a custom annealing function outlined in Algorithm 3, which ensures that the generated solution, $x_{k+1}$, is always feasible. Here $x_{LB}$ and $x_{UB}$ represent the lower and upper bounds defined previously, and $t_k$, $\alpha_k$, $\beta_k \in \mathbb{U}(0, 1)$. time, the algorithm takes a weighted summation of the values thus obtained with the corresponding values from the previous iteration, such that the new design values are not too far off from the previous iteration. Further, all five components of the solution vector $x_{k+1}$ are compared against their respective bounds and adjusted accordingly, followed by a projection of the solution onto the feasible region. Finally, for the global coverage use case, the phasing parameter, $f_{p(k+1)}$, is set to 1, in line with the other state-of-the-art global coverage constellations. For all other use cases, if the phasing parameter happens to exceed the number of orbital planes in the constellation, $f_{p(k+1)}$ is scaled down. Additionally, the acceptance probability, $\mathbb{X}(x_{k+1})$, is given by $$\mathbb{P}(x_{k+1}) = \frac{1}{1 + \exp\left(\frac{G(x_{k+1}, y_{k+1}, z) - G(x_k, y_k, z)}{\Gamma_k}\right)}. \quad (31)$$

Algorithm 3 LsCD Annealing Function

1:  $x_{k+1} \leftarrow x_k + t_k \Gamma_k$
2:  $n_{t(k+1)} \leftarrow n_{s(k+1)} n_{p(k+1)}$
3:  while $n_{t(k+1)} > n_t^{MAX}$ do
4:      if $n_{s(k+1)} > n_{p(k+1)}$ then
5:          $n_{s(k+1)} \leftarrow \max(\lfloor n_t^{MAX} n_{s(k+1)}/n_{t(k+1)} \rfloor, n_s^{MIN})$
6:          $n_{p(k+1)} \leftarrow \max(\lfloor n_t^{MAX}/n_{s(k+1)} \rfloor, n_p^{MIN})$
7:      else
8:          $n_{p(k+1)} \leftarrow \max(\lfloor n_t^{MAX} n_{p(k+1)}/n_{t(k+1)} \rfloor, n_p^{MIN})$
9:          $n_{s(k+1)} \leftarrow \max(\lfloor n_t^{MAX}/n_{p(k+1)} \rfloor, n_s^{MIN})$
10:     end if
11:     $n_{s(k+1)} \leftarrow \alpha_k n_{s(k+1)} + (1 - \alpha_k) n_{s(k)}$
12:     $n_{p(k+1)} \leftarrow \alpha_k n_{p(k+1)} + (1 - \alpha_k) n_{p(k)}$
13: end while
14: for $i \leftarrow 1$ to 5 do
15:     if $x_{k+1}[i] < x_{LB}[i]$ then
16:         $x_{k+1}[i] \leftarrow x_{LB}[i]$
17:     else if $x_{k+1}[i] > x_{UB}[i]$ then
18:         $x_{k+1}[i] \leftarrow x_{UB}[i]$
19:     end if
20:     $x_{k+1}[i] \leftarrow \beta_k x_{k+1}[i] + (1 - \beta_k) x_k[i]$
21: end for
22: $n_{s(k+1)} \leftarrow \lfloor n_{s(k+1)} \rfloor$
23: $n_{p(k+1)} \leftarrow \lfloor n_{p(k+1)} \rfloor$
24: $\lambda_{UB} = 180$ & $\lambda_{LB} = -180$ then
25:     $f_{p(k+1)} \leftarrow 1$
26: else
27:     if $f_{p(k+1)} > n_{p(k+1)} - 1$ then
28:         $f_{p(k+1)} \leftarrow n_{p(k+1)} - 1$
29:     end if
30: end if
31: return $x_{k+1}$ We have mentioned the importance of the cooling schedule previously, and note that the exponential cooling schedule works best with LsCD problem. Therefore, $$\Gamma k = 0.95^k \Gamma 0, \quad (32)$$

where $\Gamma_0$ is the initial temperature. With this, our description of the SA-based optimization framework is complete.

Constellation Designs For IoST: Having presented the details concerning the design optimization framework, in this section, we use a MATLAB-based implementation of the framework to design constellations for IoST pertaining to three distinct use case requirements: (i) global coverage, (ii) latitude-specific coverage, and (iii) regional coverage. For example, the global coverage use case is well-suited for applications such as worldwide connectivity, while the regional coverage use case serves applications such as localized terrain monitoring and reconnaissance. For the global coverage case, we compare the constellation, as designed by the presented framework, with several state-of-the-art global constellations. Further, for each coverage use case, we vary different elements of the static parameter z to examine the impact of system parameter variation on constellation design.

We note that $e=0$, $n_t^{MAX}=500$, and $\Gamma_0=100°$ C. throughout, with $w_1=0.17$, $w_2=0.25$, $w_3=0.25$, and $w_4=0.33$, wherein $\Gamma_0$ represents the standard initial temperature for SA. Further, IoST is meant to be deployed in the exosphere at altitudes between 600 km and 900 km, therefore $h^{MIN}=600$ km and $h^{MAX}=900$ km. Additionally, we restrict the design to prograde orbits only with inclinations that do not exceed 90° In particular, our choice of weights $w_1$ through $w_4$ is motivated by the relative importance of connectivity within IoST, therefore, we accord it a higher priority than other metrics. On the other hand, the weights associated with the two coverage related metrics take the same value, reflecting their equal relative importance. In general, constellation designers may set these weights according to the specific use case they wish to optimize for.

The Global Coverage Use Case: The global coverage use case is characterized by $\lambda_{UB}=180°$, $\lambda_{LB}=-180°$, $\varphi_{UB}=90°$ and $\varphi_{LB}=-90°$. First, for a minimum elevation angle of $\delta=15°$, we vary the maximum feasible ISL range, $d^{RANGE}$, from 500 km to 3000 km in steps of 500 km, and the constellations thus obtained from the framework have been listed in Table I. We have selected $\delta=15°$ in accordance with the existing literature associated with CubeSats.

TABLE I

IoST Constellation Design Configurations for Global Coverage.

| Maximum ISL Range ($d^{RANGE}$) | Optimal IoST Constellation ($x * = [h* i* n_s* n_p* f_p*]^T$) |
|---|---|
| 500 km | $[862.49\ 78.35\ 16\ 7\ 1]^T$ |
| 1000 km | $[754.57\ 77.47\ 18\ 8\ 1]^T$ |
| 1500 km | $[899.55\ 78.59\ 13\ 8\ 1]^T$ |
| 2000 km | $[724.68\ 76.11\ 23\ 12\ 1]^T$ |
| 2500 km | $[723.27\ 77.98\ 23\ 21\ 1]^T$ |
| 3000 km | $[759.20\ 76.10\ 17\ 28\ 1]^T$ |

The primary motivation for varying $d^{RANGE}$ comes from the fact that it is closely tied to the communication subsystem of the constituent CubeSats. For example, the system designer can modify metrics such as transmit power and the transmit and receive gains, in order to obtain the desired $d^{RANGE}$ value. Therefore, varying $d^{RANGE}$ allows us to examine the impact varying levels of connectivity have on the design of the constellation.

We note that initially as $d^{RANGE}$ is increased from 500 km to 1500 km the number of CubeSats in the constellation does not change significantly, staying at around 120 CubeSats on an average. However, on increasing $d^{RANGE}$ to 2000 km, and then to 2500 km, the number of CubeSats steadily increases from 276 to 483. While this result might feel counterintuitive at first, the trend is best explained by examining the number of active ISLs in each case. For relatively short ISL ranges, increasing the number of CubeSats does not have a significant impact on connectivity since the link distance serves as the limiting factor. For example, for a 500 CubeSat constellation, the average inter-satellite distance exceeds 500 km by a large margin. Therefore, a $d^{RANGE}$ of 500 km is not sufficient to establish a large number of ISLs, and, consequently, the connectivity metric does not improve by a significant amount.

Therefore the framework prefers to maintain a relatively consistent number of CubeSats in the constellation, at the cost of modest gains in connectivity going from 4 active ISLs at 500 km to 51 at 1500 km. However, beyond this point, there is a massive increase in connectivity with the number of ISLs at 2000 km and 2500 km increasing to 1210 and 5264 respectively, offsetting the increase in the number of CubeSats, i.e., the G1(•) term in the objective. As expected, a further increase in $d^{RANGE}$ only results in a modest increase in the number of active ISLs, and once again, the system works to minimize the number of CubeSats to 476 at 3000 km. Further, from Table I, we note that the orbital altitude of the constellation changes in accordance with the constellation density, increasing to counter the decrease in the number of CubeSats and vice versa. On the other hand, if we set $w_1=0$, the framework will no longer optimize for constellation density, and the number of CubeSats in the constellation will always tend towards $n_t^{MAX}$, in order to maximize the coverage and connectivity metrics.

Next, we compare the IoST constellation for $\delta=15=2500$ km, with other state-of-the-art constellations. Our choice of elevation angle and maximum feasible link distance for the IoST constellation follows from the fact that these metrics result in the most dense configuration. The comparison is based on the constellation quality metric, $\eta$, which takes into account constellation density, coverage, and connectivity. In the interest of fairness, the normalizing parameters are given by $n_t^{MAX}=1584$ and $n_{ISL}=40$ based on the Starlink constellation, whose parameters reflect the maximum possible values. Further, all weights $w_1$ through $w_4$ are set to 0.25 in order to accord each metric equal priority. At the outset, IoST offers the best performance with $\eta=1.973$, with Starlink taking second place with $\eta=1.925$, followed by Kepler with $\eta=1.86$. We also note that while IoST achieves a marginally higher metric than Starlink, it does so while requiring only ⅓ of the satellites.

Further, we take a look at the level of coverage and connectivity attained by each of the three constellations. The percentage coverage brings forth a key advantage of the IoST constellation, which achieves significantly better performance than both Kepler and Starlink. In fact, IoST offers a marked 17% improvement in coverage over Kepler. In order to further demonstrate the efficacy of the design framework, we also compare the classical coverage metric, the average revisit time, across all three constellations. The designed IoST constellation offers the best revisit time performance across all latitudes with a revisit time of 0 sec.

A revisit time of 0 sec implies that the designed constellation is able to provide continuous gap-free coverage across all latitudes. On the other hand, Starlink's coverage is absent in the higher latitudes exceeding 67°, while Kepler only offers continuous coverage in the polar regions. In comparing the connectivity performance, we obtain the ISL density for each constellation. The ISL density in this case has been calculated for $\beta=1$. In this regard we note that all three constellations achieve a similar level of performance.

Thus, through a mix of new as well as classical metrics, we have demonstrated that the constellation designed by our framework achieves excellent performance in terms of both coverage and connectivity, while minimizing the CubeSats in the constellation. More generally, the results serve to ratify the optimality of the solutions obtained. Having showcased the efficacy of our proposed framework, we now leverage it for designing constellations for specific coverage use cases, as detailed next.

The Latitude-specific Coverage Use Case: For the latitude-specific coverage use case, we leverage the proposed framework to design constellations to provide optimized coverage and connectivity within a specific set of latitudes. The results presented in this section are based on $\varphi_{UB}=50°$ and $\varphi_{LB}=-50°$, with $d^{RANGE}$ fixed at 2500 km. Further, we vary the minimum elevation angle constraint, $\delta$, in steps of 5° from 5° to 20°. The optimal IoST constellations thus obtained have been showcased in Table II.

TABLE II

IoST Constellation Design Configurations for Latitude-specific Coverage.

| Elevation Angle Constraint ($\delta$) [°] | Optimal IoST Constellation ($x^* = [h^*\ i^*\ n_s^*\ n_p^*\ f_p^*]^T$) |
|---|---|
| 5 | $[784.46\ 25.81\ 22\ 22\ 1]^T$ |
| 10 | $[824.68\ 30.08\ 22\ 22\ 1]^T$ |
| 15 | $[861.74\ 32.88\ 27\ 18\ 1]^T$ |
| 20 | $[880.09\ 35.48\ 23\ 20\ 1]^T$ |

Unlike the global coverage use case, in the absence of comparable constellations targeting latitude-specific coverage, our primary intention in this section is to showcase the adaptability of the framework, i.e., as the static parameters change, the constellation design adapts to maintain a similar level of performance in terms of coverage and connectivity over the latitudes of interest. Our assertion is reinforced through the results shown in Table II. From Table III, we note that as the minimum elevation angle constraint increases, the orbital inclination also increases, going from 25.81° at 5° elevation to 35.48° at 20° elevation. This result can be explained by the fact that as the minimum elevation angle constraint increases, latitudes that are farther away from equator, i.e. $\varphi=0°$, are no longer within the field of view of the CubeSats in the constellation. As a result, the system compensates for this change by increasing the orbital inclination, allowing for the higher latitudes to return to the field of view, which is necessary for maintaining adequate coverage. Further, the number of CubeSats within the constellation stays relatively constant at or around 470, demonstrating that a change in the elevation angle requirements brought forth by system upgrades such as a change in the onboard sensing devices, does not necessitate the deployment of additional CubeSats, in order to maintain optimality, thus saving costs.

Regarding the level of coverage achieved by the different constellations over a 24 h observation period, the percentage coverage remains consistent across the board, in going from 90.5% at 5° elevation to 89.5% at 20° elevation. In order to further quantify the coverage performance, we also measure the average revisit time achieved by each constellation using STK. As noted, the average revisit time across all latitudes of interest is 0 seconds, thus verifying coverage optimality.

The number of ISLs per CubeSat decreases from an average of 16 to an average of 13 as the elevation angle constraint is increased from 5° to 20°. This decrease can be attributed to an increase in the orbital altitude as the elevation angle constraint increases. With an increase in orbital altitude, the CubeSats grow farther apart, reducing the number of ISLs per CubeSat. However, the decrease of three ISLs on an average still represents a less than 20% deviation, indicating the similar connectivity performance of the four constellations under consideration.

The Regional Coverage Use Case: For the regional coverage use case, we take into consideration the bounding box that includes the continental United States. The bounds for this region are given by $\lambda_{UB}=-66.93°$, $\lambda_{LB}=-125°$, $\varphi_{UB}=49.59$ and $\varphi_{LB}=24.94°$. As in the global coverage use case, we vary $d^{RANGE}$ from 500 km to 3000 km for an elevation angle constraint of $\delta=15°$, with the resulting optimal constellation configurations being presented in Table III. The change in the number of orbital planes, the number of CubeSats per orbit, and the number of ISLs in the constellation with change in the maximum feasible ISL range shows a familiar trend. Relaxation in the ISL range constraint allows for an increase in the number of active ISLs and a subsequent increase in the number of CubeSats in the constellation, going from 72 at $d^{RANGE}=500$ km to 180 at $d^{RANGE}=2500$ km, beyond which a further relaxation of the constraint serves no advantage and the constellation size decreases. From an operational standpoint, we would prefer to have a larger number of active ISLs and therefore $d^{RANGE}=2500$ km would represent the optimal operating point. The corresponding constellation achieves 82% coverage on an average. At the same time, the next best coverage is offered for $d^{RANGE}=500$ km, despite having the least number of satellites. This result can be attributed to the orbital altitude, i.e., h*=734.52 km, of the resulting constellation, which allows for a larger spherical radius and consequently better coverage.

TABLE III

IoST Constellation Design Configurations for Regional Coverage

| Maximum ISL Range ($d^{RANGE}$) | Optimal IoST Constellation ($x^* = [h^* \; i^* \; n_s^* \; n_p^* \; f_p^*]^T$) |
|---|---|
| 500 km | $[734.52 \; 35.58 \; 12 \; 9 \; 4]^T$ |
| 1000 km | $[671.29 \; 33.77 \; 12 \; 10 \; 5]^T$ |
| 1500 km | $[622.10 \; 38.02 \; 13 \; 14 \; 10]^T$ |
| 2000 km | $[668.25 \; 34.17 \; 13 \; 9 \; 8]^T$ |
| 2500 km | $[651.09 \; 37.50 \; 20 \; 9 \; 1]^T$ |
| 3000 km | $[691.40 \; 37.36 \; 18 \; 6 \; 4]^T$ |

To summarize, by evaluating the performance of our constellation design framework for different use cases, and by benchmarking the results against the existing state-of-the-art solutions, we have demonstrated the versatility and scalability of the presented design solution.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A computational framework for designing a constellation that includes a plurality of cube satellites (CubeSats), comprising:

(a) an orbit propagation module that receives a plurality of static parameters for the constellation and that determines a position vector, a ground track and sub-satellite points for each of the plurality of CubeSats;

(b) a coverage estimation module that receives the plurality of static parameters for the constellation and that estimates Earth coverage for the constellation;

(c) a connectivity estimation module that receives the plurality of static parameters for the constellation and that determines active inter-satellite links (ISL) in the constellation;

(d) an annealing module that receives input from the orbit propagation module, the coverage estimation module and the connectivity module and that employs an annealing algorithm that generates a constellation design.

2. The computational framework for designing a constellation of claim 1, wherein the plurality of static parameters includes: e $\delta$ $d^{RANGE}$ $n_t^{MAX}$ $\lambda_{UB}$ $\lambda_{LB}$ $\Phi_{UB}$ $\Phi_{LB}$, where:

e is an orbital eccentricity of the constellation;

$\delta$ is a minimum elevation angle constraint of the constellation;

$d^{RANGE}$ is a maximum feasible ISL range of the constellation;

$n_t^{MAX}$ is a maximum number of CubeSats in the constellation;

$\lambda_{UB}$ is a longitude upper bound defining a region of interest;

$\lambda_{LB}$ is a longitude lower bound defining the region of interest;

$\Phi_{UB}$ is a latitude upper bound defining the region of interest; and $\Phi_{LB}$ is a latitude lower bound defining the region of interest.

3. The computational framework for designing a constellation of claim 1, wherein the annealing algorithm executes the following steps:

$x_{k+1} \leftarrow x_k + t_k \Gamma_k$
$n_{t(k+1)} \leftarrow n_{s(k+1)} n_{p(k+1)}$
while $n_{t(k+1)} > n_t^{MAX}$ do
  if $n_{s(k+1)} > n_{p(k+1)}$ then
    $n_{s(k+1)} \leftarrow \max(\lfloor n_t^{MAX} n_{s(k+1)}/n_{t(k+1)} \rfloor, n_s^{MIN})$
    $n_{p(k+1)} \leftarrow \max((\lfloor n_t^{MAX}/n_{s(k+1)} \rfloor, n_p^{MIN})$
  else
    $n_{p(k+1)} \leftarrow \max(\lfloor n_t^{MAX} n_{p(k+1)}/n_{t(k+1)} \rfloor, n_p^{MIN})$
    $n_{s(k+1)} \leftarrow \max((\lfloor n_t^{MAX}/n_{p(k+1)} \rfloor, n_s^{MIN})$
  end if
  $n_{s(k+1)} \leftarrow \alpha_k n_{s(k+1)} + (1 - \alpha_k) n_{s(k)}$
  $n_{p(k+1)} \leftarrow \alpha_k n_{p(k+1)} + (1 - \alpha_k) n_{p(k)}$
end while
for i $\leftarrow$ 1 to 5 do
  if $x_{k+1}[i] < x_{LB}[i]$ then
    $x_{k+1}[i] \leftarrow x_{LB}[i]$
  else if $x_{k+1}[i] > x_{UB}[i]$ then
    $x_{k+1}[i] \leftarrow x_{UB}[i]$
  end if
  $x_{k+1}[i] \leftarrow \beta_k x_{k+1}[i] + (1 - \beta_k) x_k[i]$
end for
$n_{s(k+1)} \leftarrow \lfloor n_{s(k+1)} \rfloor$
$n_{p(k+1)} \leftarrow \lfloor n_{p(k+1)} \rfloor$
if $\lambda_{UB} = 180$ & $\lambda_{LB} = -180$ then
  $f_{p(k+1)} \leftarrow 1$
else
  if $f_{p(k+1)} > n_{p(k+1)} - 1$ then
    $f_{p(k+1)} \leftarrow n_{p(k+1)} - 1$
  end if
end if
return $x_{k+1}$ where:

$n_{t(k+1)}$ is a total number of CubeSats in the constellation;

$x_{k+1}$ is a candidate solution;

$\lambda_{UB}$ is a longitude upper bound defining a region of interest;

$\lambda_{LB}$ is a longitude lower bound defining the region of interest;

$n_{s(k+1)}$ is a number of CubeSats per orbit;
$n_{p(k+1)}$ is a number of orbital planes;
$\alpha_k$ is a target Cubesat's location.

4. A cube satellite constellation, including a maximum ISL Range ($d^{RANGE}$) having an constellation configuration described as ($x^*=[h^*\ i^*\ n_s^*\ n_p^*\ f_p^*]^T$), where:

h* represents an orbital altitude of the CubeSats in the constellation;

i* represents a orbital inclination of the CubeSats in the constellation;

$n_s^*$ represents a number of CubeSats per orbit in the constellation;

$n_p^*$ represents a number of orbital planes in the constellation;

$f_p^*$ represents a phasing parameter of the constellation; and

T represents time.

5. The cube satellite constellation of claim 4, wherein the maximum ISL Range=500 km and x*=[862:49 78:35 16 7 1]$^T$.

6. The cube satellite constellation of claim 4, wherein the maximum ISL Range=1000 km and x*=[754:57 77:47 18 8 1]$^T$.

7. The satellite constellation of claim 4, wherein the maximum ISL Range=1500 km and x*=[899:55 78:59 13 8 1]$^T$.

8. The cube satellite constellation of claim 4, wherein the maximum ISL Range=2000 km and x*=[724:68 76:11 23 12 1]$^T$.

9. The cube satellite constellation of claim 4, wherein the maximum ISL Range=2500 km and x*=[723:27 77:98 23 21 1]$^T$.

10. The cube satellite constellation of claim 4, wherein the maximum ISL Range=3000 km and x*=[759:20 76:10 17 28 1]$^T$.

* * * * *